United States Patent
Kim

(10) Patent No.: US 10,549,778 B2
(45) Date of Patent: Feb. 4, 2020

(54) MOTOR DRIVEN POWER STEERING SYSTEM AND METHOD FOR DETERMINING NEUTRAL POSITION THEREOF

(71) Applicant: HYUNDAI MOBIS CO., LTD., Seoul (KR)

(72) Inventor: Tae Hong Kim, Seongnam-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 324 days.

(21) Appl. No.: 15/492,989

(22) Filed: Apr. 20, 2017

(65) Prior Publication Data

US 2017/0305463 A1 Oct. 26, 2017

(30) Foreign Application Priority Data

Apr. 21, 2016 (KR) .................. 10-2016-0048690

(51) Int. Cl.
*B62D 5/04* (2006.01)
*B62D 15/02* (2006.01)
*B62D 6/00* (2006.01)

(52) U.S. Cl.
CPC ......... *B62D 15/024* (2013.01); *B62D 5/0466* (2013.01); *B62D 6/002* (2013.01); *B62D 15/0245* (2013.01)

(58) Field of Classification Search
CPC ............. B62D 15/024; B62D 15/0245; B62D 5/0466; B62D 6/002; B62D 6/00
See application file for complete search history.

(56) References Cited

U.S. PATENT DOCUMENTS

2009/0125187 A1* 5/2009 Yamamoto ........... B62D 5/0457
701/42
2012/0059550 A1* 3/2012 Maeda ................. B62D 5/0466
701/42

FOREIGN PATENT DOCUMENTS

| CN | 102398630 A | 4/2012 |
| JP | 2003-040131 A | 2/2003 |
| KR | 10-2012-0053300 A | 5/2012 |

OTHER PUBLICATIONS

Office Action of corresponding Chinese Patent Application No. 201710248406.5—6 pages (dated Nov. 2, 2018).
Office Action of corresponding Chinese Patent Application No. 201710248406.5—7 pages (dated Jul. 2, 2019).

* cited by examiner

*Primary Examiner* — Nga X Nguyen
(74) *Attorney, Agent, or Firm* — Knobbe Martens Olson & Bear LLP

(57) ABSTRACT

A method for determining a neutral position of a MDPS (Motor Driven Power Steering) system may include: determining, by a controller, whether a vehicle is driving; determining, by the controller, whether a steering torque is smaller than a preset break point on a boost curve, when the vehicle is driving; and determining, by the controller, that the vehicle is in a neutral state, when the steering torque is smaller than the preset break point on the boost curve.

8 Claims, 3 Drawing Sheets

MOTOR DRIVEN POWER STEERING SYSTEM AND METHOD FOR DETERMINING NEUTRAL POSITION THEREOF

CROSS-REFERENCES TO RELATED APPLICATIONS

The present application claims priority to Korean application number 10-2016-0048690, filed on Apr. 21, 2016, which is incorporated by reference in its entirety.

BACKGROUND OF THE INVENTION

The present invention relates to a MDPS (Motor Driven Power Steering) system and a method for determining a neutral position thereof, and more particularly, to a MDPS system which is capable of determining a neutral position of a steering wheel by combining vehicle speed information and torque information during driving, and a method for determining a neutral position thereof.

In general, the MDPS system refers to a system which includes a steering motor installed at the bottom of a steering wheel shaft so as to generate an assist steering force, and drives the steering motor to operate a power steering wheel when a vehicle is started, unlike a typical power steering system which operates a power steering wheel using oil circulated by operation of a power pump.

The MDPS system determines the neutral position of the steering wheel using steering angle information. If a breakdown occurs in a sensor to detect a steering angle, the MDPS may not accurately determine the neutral position of the steering wheel.

When the wheel alignment gets distorted, the vehicle may lean to any one side while traveling with the steering wheel in the neutral state. That is, although the steering wheel is in the neutral state, the vehicle may lean to any one side because the wheel alignment is distorted. Thus, a driver may not secure the driving stability, due to a reduction in control ability and a strange feeling caused by an excessive steering operation.

The related art of the present invention is disclosed in Korean Patent Publication No. 10-2012-0053300 published on May 25, 2012 and entitled "MDPS control device and method".

SUMMARY OF THE INVENTION

Embodiments of the present invention are directed to a MDPS system capable of determining a neutral position of a steering wheel by combining vehicle speed information and torque information during driving, and a method for determining a neutral position thereof.

In one embodiment, a method for determining a neutral position of a MDPS system may include: determining, by a controller, whether a vehicle is driving; determining, by the controller, whether a steering torque is smaller than a preset break point on a boost curve, when the vehicle is driving; and determining, by the controller, that the vehicle is in a neutral state, when the steering torque is smaller than the preset break point on the boost curve.

When the vehicle speed is equal or to more than a preset speed, the controller may determine that the vehicle is driving.

The method may further include, when the vehicle is in the neutral state: calculating, by the controller, a distortion amount of wheel alignment; and outputting a compensation torque to a motor in order to compensate for the distortion amount in the corresponding direction in response to the distortion amount and direction of the wheel alignment.

The calculating of the wheel alignment distortion amount may include calculating the wheel alignment distortion amount based on a difference between a value detected in the currently driven vehicle and a value included in a characteristic data table which is stored in an internal memory and includes characteristic data measured in a normal state in advance.

The characteristic data table may include one or more of a vehicle speed, steering angle and yaw rate for each vehicle motion.

The break point may be varied according to a vehicle speed.

In another embodiment, a MDPS system may include: a vehicle speed sensor configured to detect a driving speed of a vehicle; a torque sensor configured to detect a steering torque of a steering wheel; and a controller configured to determine whether the vehicle is driving, based on the driving speed of the vehicle, determine whether the steering torque is smaller than a preset break point on the boost curve, when the vehicle is driving, and determine that the vehicle is in a neutral state when the steering torque is smaller than the preset break point on the boost curve.

When the vehicle speed is equal or to more than a preset speed, the controller may determine that the vehicle is driving.

When the vehicle is in the neutral state, the controller may calculate a distortion amount of wheel alignment, and output a compensation torque to a motor in order to compensate for the distortion amount in the corresponding direction in response to the distortion amount and direction of the wheel alignment.

The controller may calculate the wheel alignment distortion amount based on a difference between a value detected in the currently driven vehicle and a value included in a characteristic data table which is stored in an internal memory and includes characteristic data measured in a normal state in advance.

The characteristic data table may include one or more of a vehicle speed, steering angle and yaw rate for each vehicle motion.

The break point may be varied according to a vehicle speed.

DESCRIPTION OF SPECIFIC EMBODIMENTS

Hereafter, a MDPS (Motor Driven Power Steering) system and a method for determining a neutral position thereof in accordance with embodiments of the present invention will be described in detail with reference to the accompanying drawings.

It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
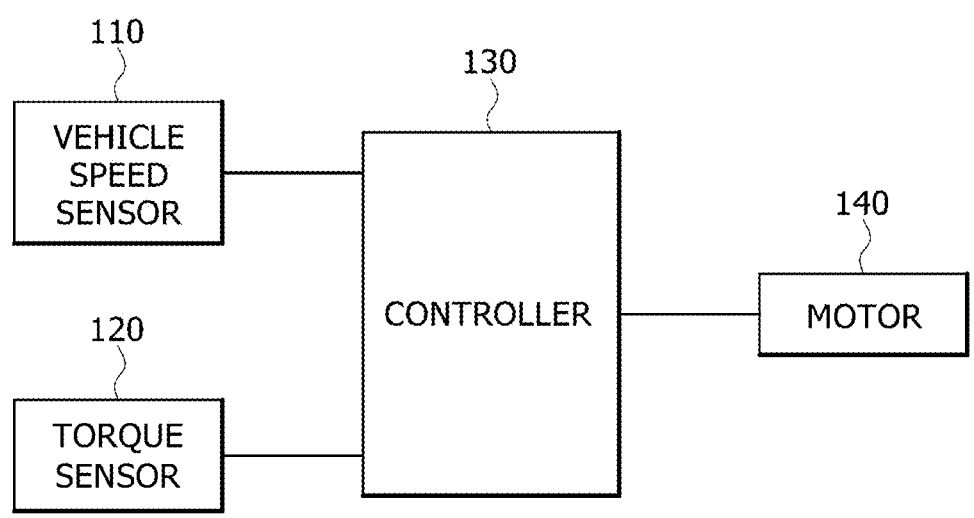
FIG. 1 is a diagram illustrating a schematic configuration of a MDPS system in accordance with an embodiment of the present invention.

FIG. 1 is a diagram illustrating a schematic configuration of a MDPS system in accordance with an embodiment of the present invention.

As illustrated in FIG. 1, the MDPS system in accordance with the embodiment of the present invention may include a vehicle speed sensor 110, a torque sensor 120, a controller 130 and a motor 140.

The vehicle speed sensor 110 may detect a traveling speed of a vehicle (that is, vehicle speed).

The vehicle speed information detected through the vehicle speed sensor 110 may be outputted to the controller 130.

The torque sensor 120 may detect a steering torque (or column torque) of a steering wheel.

The torque information detected through the torque sensor 120 may be outputted to the controller 130.

The controller 130 may calculate a distortion amount of wheel alignment during driving, based on the vehicle speed information detected through the vehicle speed sensor 110 and the torque information detected through the torque sensor 120, and output a left or right compensation torque to the motor 140 (or MDPS motor) in response to the distortion amount.

Typically, when wheel alignment gets distorted to any one side, a vehicle may lean to any one side while traveling with a steering wheel in the neutral state.

Therefore, a driver may have difficulties in securing driving stability, due to a reduction in control ability and a strange feeling caused by excessive steering operation. The excessive steering operation may indicate that the driver steers the steering wheel to the opposite side of the side to which the vehicle leans, in order to drive straightly.

For reference, when a smaller torque than a preset break point (for example, Tx) in a boost map or boost curve (refer to FIG. 3) is applied to the motor 140 while the driver drives the vehicle with a vehicle speed (that is, vehicle driving state), the controller 130 may determine that the vehicle is on-center driven.

At this time, the break point Tx may differ depending on a tuning map for each vehicle speed, and a torque amount required for maintaining the neutral state may differ due to the self-alignment characteristic of the vehicle, while the vehicle is driven with a speed (that is, vehicle driving state).

The MDPS system in accordance with the present embodiment can determine the neutral position by combining the vehicle speed information and the torque information, without using steering angle information.

That is, since even the same kinds of vehicles have different self-alignment characteristics depending on vehicle speed and require different torque values for driving in a neutral state depending on vehicle speed, the torque amount required for determining the neutral state may also be varied.

Therefore, the MDPS system in accordance with the embodiment of the present invention may use the boost curve (refer to FIG. 3) to determine a neutral state during driving, in consideration of the above-described characteristics. Thus, the MDPS system can easily determine a neutral state for each vehicle speed in real time, without using steering angle information.

Furthermore, when the wheel alignment of the vehicle is not distorted, a yaw rate may not be significantly changed. However, if the vehicle leans to any one side, the vehicle may have a different yaw rate from when the vehicle is on-center driven.

Therefore, the MDPS system in accordance with the embodiment of the present invention may determine the neutral state and the wheel alignment distortion of the vehicle in real time, based on a characteristic data table stored in an internal memory (not illustrated). The characteristic data table may include characteristic data which are previously measured in a normal state where the wheel alignment is not distorted, and the characteristic data may include a vehicle speed, a steering angle and a yaw rate for each vehicle motion.

Furthermore, the MDPS system may reversely calculate a distortion amount of the wheel alignment according to a difference between a value included in the characteristic data table and a value detected from the currently driven vehicle. The characteristic data table may include a vehicle speed, steering angle and yaw rate for each vehicle motion, and the value detected from the currently driven vehicle may include a vehicle speed, torque and yaw rate.

The wheel alignment distortion amount depending on the difference may be calculated with reference to the characteristic data table including characteristic data which are previously measured in the vehicle, depending on each condition. When the wheel alignment distortion amount is calculated, the controller 130 may apply a compensation torque (or left or right compensation torque) to the motor 140 in order to compensate for the distortion amount in the corresponding direction in response to the distortion amount and direction of the wheel alignment, thereby improving the steering feeling and control ability of the driver while helping the driver to safely drive the vehicle.

The compensation torque may indicate a torque value for adjusting a reference value (or offset value) in order to prevent the steering wheel from returning to the default neutral state before the wheel alignment is distorted.

Figure 2:
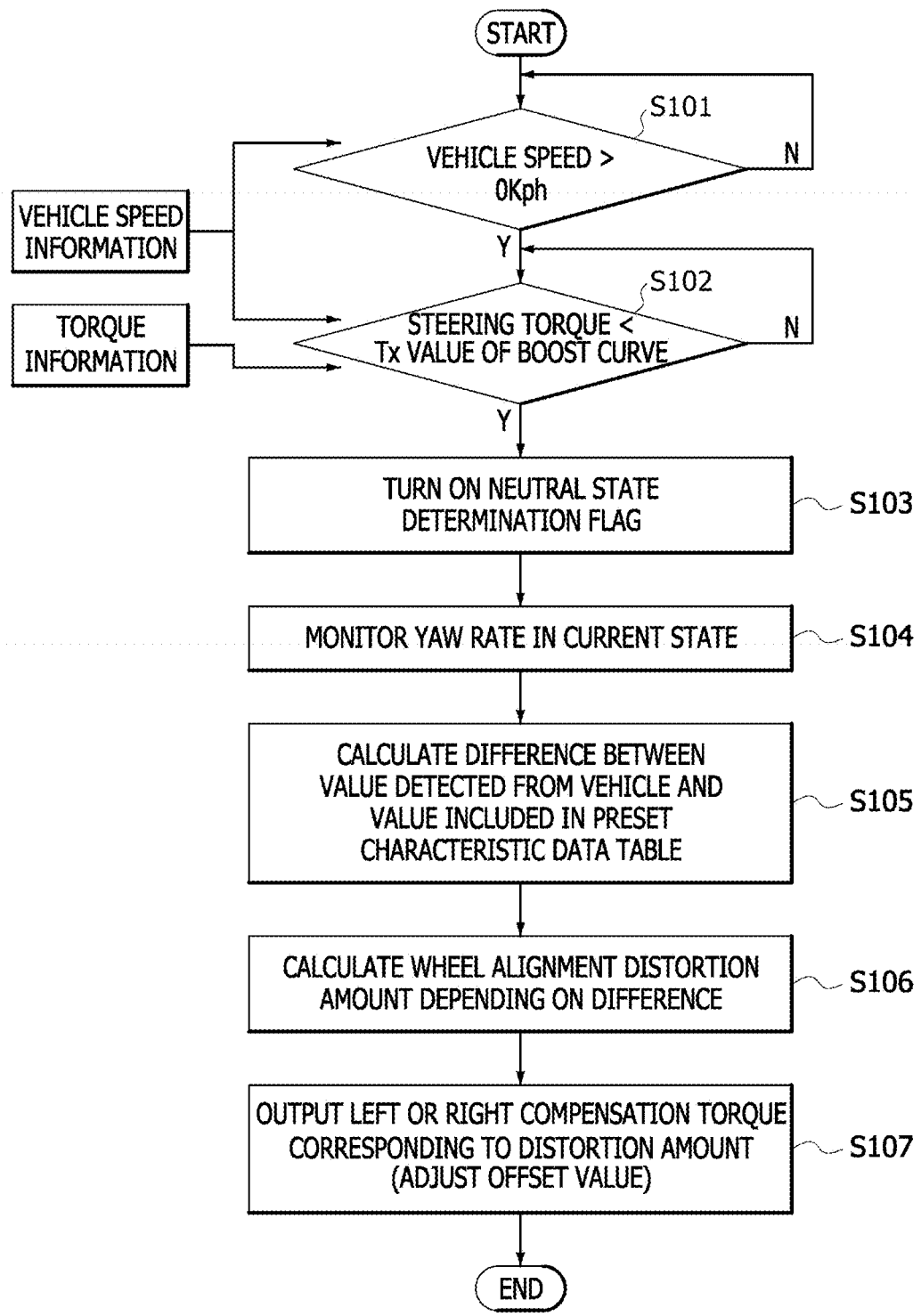
FIG. 2 is a flowchart for describing a method for determining a neutral position of a MDPS system in accordance with an embodiment of the present invention.

FIG. 2 is a flowchart for describing a method for determining a neutral position in a MDPS system in accordance with an embodiment of the present invention.

As illustrated in FIG. 2, the controller 130 may determine whether the vehicle is driving with a vehicle speed, at step S101.

That is, when the vehicle speed is equal to or higher than a preset speed (for example, 0Kph), the controller 130 may determine that the vehicle is driving with a vehicle speed.

Figure 3:
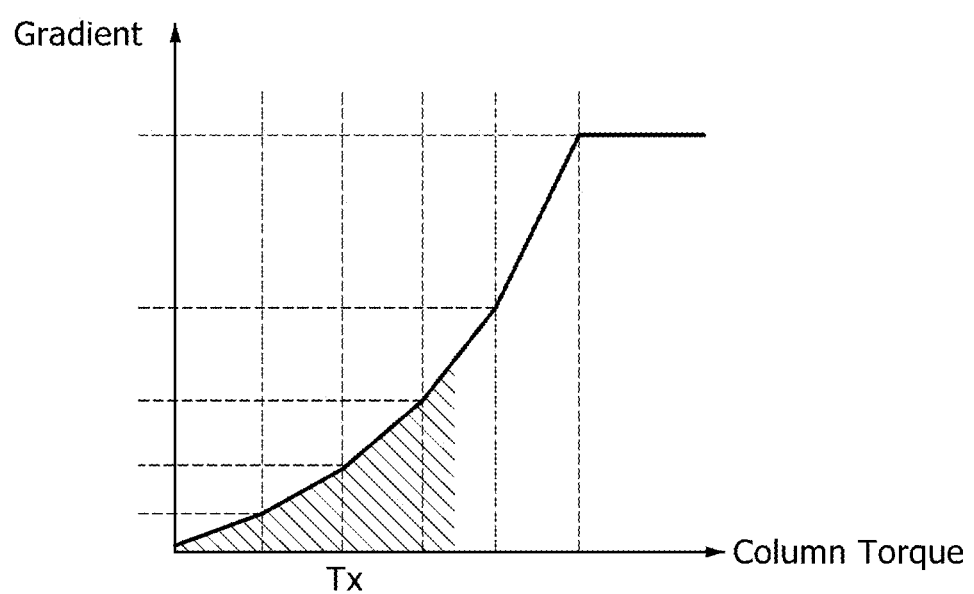
FIG. 3 is a diagram illustrating a boost curve in which a break point for determining a neutral state in FIG. 2 is set.

When the vehicle is driving (Yes at step S101), the controller 130 may determine whether a torque (or steering torque) is smaller than a preset break point (for example, Tx) in the boost curve of FIG. 3, at step S102.

When the torque (or steering torque) is smaller than the preset break point Tx in the boost curve (Yes at step S102), the controller 130 may turn on a neutral state determination flag or set the neutral state determination flag to 1, at step S103.

When a shock or damage (breakdown) of a tire or the like suddenly occurs during driving, the wheel alignment of the vehicle may get distorted. When the neutral state of the steering wheel is not changed in response to the distortion of the wheel alignment, a driver may have a strange feeling, and lose the control ability.

Therefore, although the controller 130 determined that the steering wheel was in the neutral state, the controller 130 may monitor a yaw rate in the current state, at step S104.

The yaw rate may be referred to as a yaw angular speed, and indicate the speed at which a rotation angle (yaw angle) around a vertical line passing through the center of the vehicle is changed.

Then, the controller 130 may calculate a difference between a value detected from the currently driven vehicle and a value included in a characteristic data table stored in an internal memory (not illustrated), at step S105. The value detected from the currently driven vehicle may include a vehicle speed, torque, yaw rate and the like. The characteristic data table may include characteristic data which are previously measured in a normal state where the wheel alignment is not distorted, and the characteristic data may include a vehicle speed, steering angle and yaw-rate for each vehicle motion The controller 130 may calculate a distortion amount of the wheel alignment depending on the difference, by referring to the characteristic data table, at step S106.

When the distortion amount of the wheel alignment is calculated after the steering wheel was determined to be in the neutral state, the controller 130 may output a compensation torque (left or right compensation torque) to the motor 140, in order to compensate for the distortion amount in the corresponding direction in response to the distortion amount and direction of the wheel alignment, at step S107.

That is, when the wheel alignment was distorted, the steering angle of the steering wheel may be shifted in response to the distortion amount, such that the vehicle is driven with the steering wheel in the neutral state. Thus, the controller 130 may correct the steering torque by the distortion amount, in order to adjust the reference value (or offset value) to the value to which the steering angle of the steering wheel is corrected. Therefore, the controller 130 can prevent the steering wheel from returning to the default neutral state before the wheel alignment was distorted, thereby improving the stability while preventing an occurrence of strange feeling and a loss of control ability.

FIG. 3 is a diagram illustrating the boost curve in which the break point for determining the neutral state in FIG. 2 is set.

The boost current may indicate a relationship between an applied input torque and an assist torque generated by a motor in a steering system in which the assist torque is generated by the motor. Referring to FIG. 3, when the break point Tx is preset in the boost curve and a smaller torque than the break point is applied to the motor 140, the controller 130 may determine that the vehicle is on-center driven. At this time, the break point Tx may differ depending on a tuning map for each vehicle speed.

In accordance with the embodiments of the present invention, the MDPS system and the method for determining a neutral position thereof can determine the neutral position of the steering wheel by combining the vehicle information and the torque information during driving. Furthermore, the MDPS system and the method for determining a neutral position thereof can not only improve the stability but also prevent an occurrence of strange feeling and a loss of control ability even though a driver drives a vehicle of which the wheel alignment is distorted.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for determining a neutral position of an MDPS (Motor Driven Power Steering) system, comprising:
   determining, by a controller, whether a vehicle is driving;
   determining, by the controller, whether a steering torque is smaller than a preset break point on a boost curve, when the vehicle is driving;
   determining, by the controller, that the vehicle is in a neutral state, when the steering torque is smaller than the preset break point on the boost curve;
   when determined that the vehicle is in the neutral state, calculating a wheel alignment distortion amount based on a difference between a yaw rate detected in the vehicle that is driving and a yaw rate included in a table that is pre-stored in at least one memory, wherein the table contains yaw rate data obtained in a normal state; and
   controlling, based on the wheel alignment distortion amount, a steering motor to generate a compensation torque for compensating the wheel alignment distortion amount.

2. The method of claim 1, wherein when a speed of the vehicle is equal or to more than a preset speed, the controller determines that the vehicle is driving.

3. The method of claim 1 wherein the table further comprises vehicle speed data, and steering angle data.

4. The method of claim 1, wherein the preset break point is varied depending on a speed of the vehicle.

5. A motor driven power steering (MDPS) system comprising:
   a vehicle speed sensor configured to detect a speed of a vehicle;
   a torque sensor configured to detect a steering torque of a steering wheel; and
   a controller configured to:
      determine whether the vehicle is driving, based on the speed of the vehicle,
      determine whether the steering torque is smaller than a preset break point on a boost curve, when the vehicle is driving,
      determine that the vehicle is in a neutral state when the steering torque is smaller than the preset break point on the boost curve,
      when determined that the vehicle is in the neutral state, calculate a wheel alignment distortion amount based on a difference between a yaw rate detected in the vehicle that is driving and a yaw rate included in a table that is pre-stored in at least one memory, wherein the table contains yaw rate data obtained in a normal state, and
      control, based on the wheel alignment distortion amount, a steering motor to generate a compensation torque for compensating the wheel alignment distortion amount.

6. The MDPS system of claim 5, wherein when the speed is equal or to more than a preset speed, the controller determines that the vehicle is driving.

7. The MDPS system of claim 5, wherein the table further comprises vehicle speed data, and steering angle data.

8. The MDPS system of claim 5, wherein the preset break point is varied depending on a vehicle speed.

* * * * *